United States Patent [19]
Grau

[11] Patent Number: 5,627,607
[45] Date of Patent: May 6, 1997

[54] SPECTACLES WITH MOVABLE GEMS

[75] Inventor: Werner Grau, Friedberg, Germany

[73] Assignee: Alpina International Sport, + Optik-Vertriebs-GmbH, Friedberg/Derching, Germany

[21] Appl. No.: 548,144

[22] Filed: Oct. 25, 1995

[30] Foreign Application Priority Data

Nov. 9, 1994 [DE] Germany ............................ 9417947 U

[51] Int. Cl.$^6$ ........................... G02C 11/02; A44C 13/00
[52] U.S. Cl. ................................................. 351/52; 63/1.1
[58] Field of Search .............................. 351/51, 52, 158; 63/11, 26, 31, 32

[56] References Cited

U.S. PATENT DOCUMENTS 2,981,022  4/1961  Anger, Jr. ................................. 351/51
4,877,320  10/1989  Holden .................................. 351/52 X Primary Examiner—Huy Mai
Attorney, Agent, or Firm—Browdy and Neimark

[57] ABSTRACT

In a pair of spectacles comprising a spectacle frame and side-pieces laterally articulated to the frame, it is provided that a recess having a cover that is transparent at least outwardly is provided on the frame and/or at least one side-piece, movable decoration elements being disposed in the recess.

4 Claims, 1 Drawing Sheet

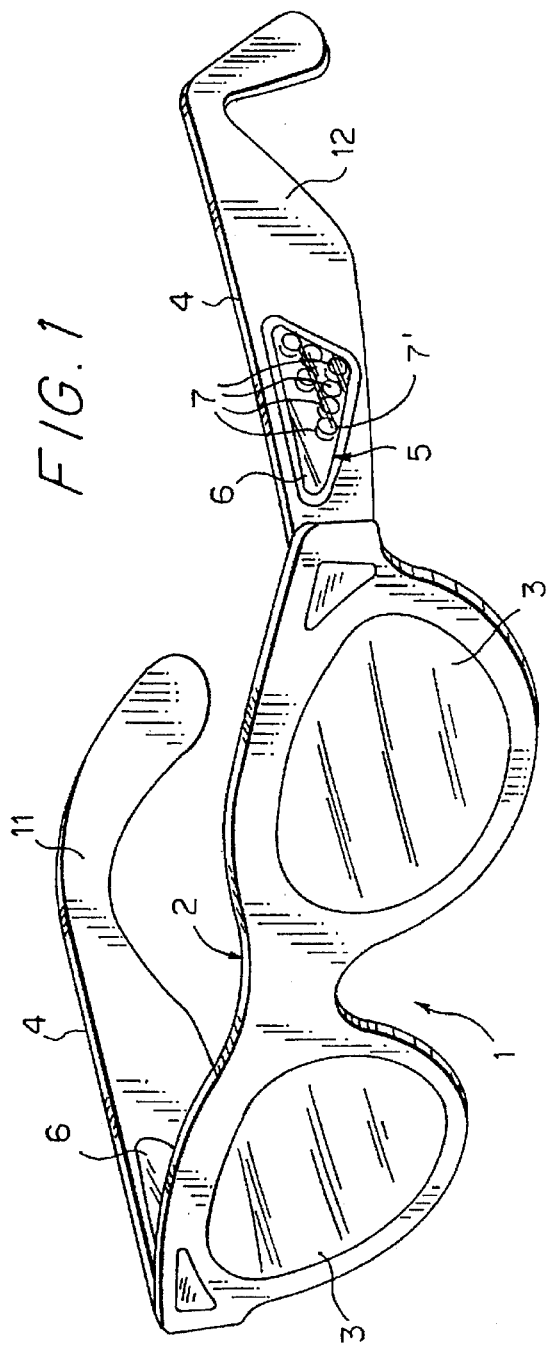
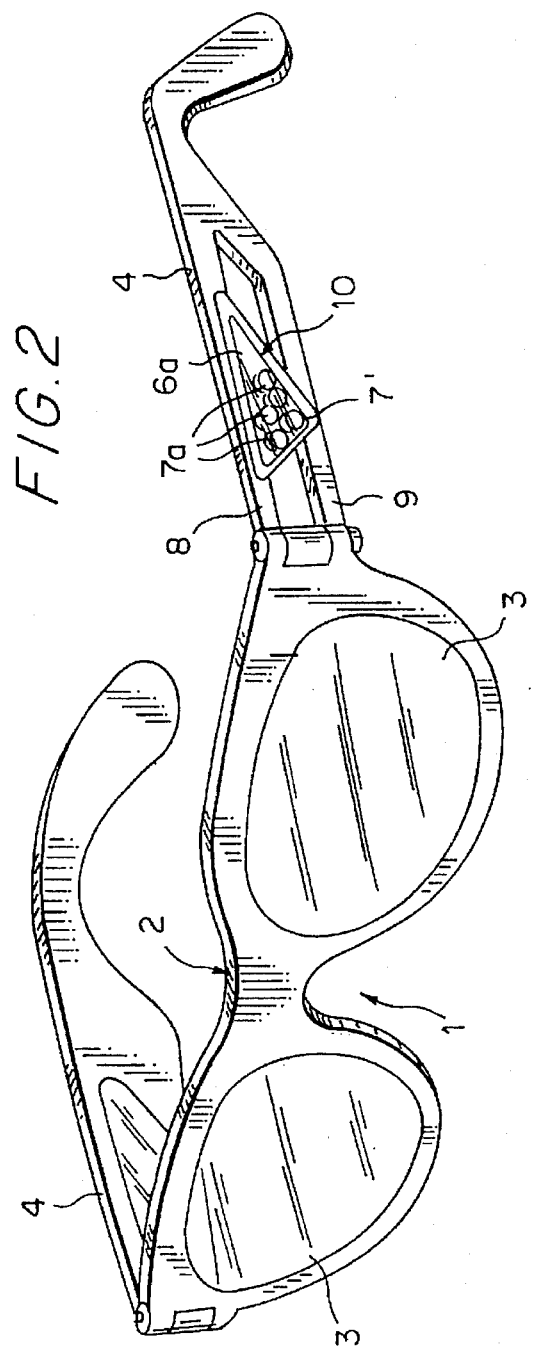

SPECTACLES WITH MOVABLE GEMS

BACKGROUND OF THE INVENTION

1. Field of the Invention

The invention relates to a pair of spectacles comprising a spectacle frame and side-pieces laterally articulated to the frame.

2. Background Art

Spectacles usually have the function of correcting defective vision or protecting from the sunlight; on the other hand, the esthetic design of spectacles highly contributes to the appearance of the wearer. Correspondingly, spectacles have developed of late that tend to emphasize fashion aspects, thus turning into substantially stylistic means for the expression of a certain personality or a fashion trend. However, the range of stylistic possibilities is usually restricted to the design of the spectacles themselves.

SUMMARY OF THE INVENTION

It is the object of the invention to embody a pair of spectacles, in particular ladies' spectacles, offering an exquisite design of eyecatching beauty accompanied by the possibility of giving a highly prestige-oriented impression without any negative effects on the functionality and the convenience of wearing.

According to the invention this object is solved in that a recess having a cover that is transparent at least outwardly is provided on the frame and/or at least one side-piece, decoration elements being disposed in the recess.

In keeping with the invention, provision can be made for the recess to have a detachable cover.

Another object of the invention consists in favorably providing decoration elements in the form of gems or semiprecious stones, the depth of the recess being dimensioned in relation to the depth of the gems in such a way that the gems are guided free from tilting while still being able to move in relation to each other.

This design ensures that the spectacles act as jewelry or as an article of jewelry in addition to their functionality, it being possible to realize a more or less sumptuous design by selecting the kind and number of the decoration elements, in particular of set or unset gems, according to the individual wishes of a possible wearer.

Further details of the invention will become apparent from the ensuing description of preferred exemplary embodiments taken in conjunction with the drawing.

BRIEF DESCRIPTION OF THE DRAWING

FIG. 1 is a perspective view of a first embodiment, and

FIG. 2 is a corresponding illustration of a second embodiment.

DESCRIPTION OF PREFERRED EMBODIMENTS

FIG. 1 illustrates a pair of spectacles 1 that comprises a frame 2 with glasses 3 and side-pieces 4 articulated in a manner known per se to either side of the frame 2.

The side-piece 4 has a recess 5 which is provided with two covers 6 on the inner side 11 and the outer side 12 of the side-piece 4 as shown in FIG. 1. At least the cover on outer side 12 is transparent and detachable.

Underneath the transparent cover 6, the recess 5 is provided with decoration elements 7 in the form of gems, the length of which in the direction perpendicular to the plane of the side-piece 4 and compared to the depth of the recess 5 defined by the two covers 6 is dimensioned such that the decoration elements 7 are able to move with every motion of the spectacles 1 along the direction of the plane of the side-piece 4. The decoration elements 7 are of substantially cylindrical with flat ends 7' which permit them to roll on each other along the direction of the plane of the side-piece 4 within recess 5. The decoration elements 7 along the are restrained from movement outside the plane of the side-piece 4 by covers 6 which preclude their flat ends 7' from tilting in the recess 5 as shown in FIGS. 1 and 2.

The embodiment of FIG. 2 differs from that of FIG. 1 in that the front portion of one of the side-pieces 4 exhibits two spaced webs 8, 9, between which a receptacle 10 is disposed and arrested by positive fit, the receptacle 10 outwardly exhibiting transparent covers 6a, in which decoration elements 7a are disposed.

What is claimed is:

1. A pair of spectacles comprising a spectacle frame (2) and side-pieces (4) laterally articulated to the frame (2), a recess (5) on at least one of the side-pieces (4) of the frames (2), the recess (5) being covered by a transparent cover (6) on an outer side of the at least one of the side-pieces (4), decoration elements (7, 7a) being disposed in the recess (5), the decoration elements (7, 7a) being gems or semi-precious stones having a length in a direction perpendicular to a plane of the at least one of the side-pieces compared to a depth of the recess (5) such that the gems or semi-precious stones are able to move in relation to each other along a direction of said plane when covered by the transparent cover (6).

2. A pair of spectacles according to claim 1, wherein said gems or semi-precious stones are cylindrical along said length to facilitate movement along the direction of said plane.

3. A pair of spectacles according to claim 1, wherein said gems or semi-precious stones have flat ends which preclude tilting of the gems or semi-precious stones in the recess when covered by said transparent cover and moved along the direction of said plane.

4. A pair of spectacles according to claim 1, wherein the transparent cover is detachable.

* * * * *